United States Patent
Mukherji et al.

(10) Patent No.: US 9,871,876 B2
(45) Date of Patent: Jan. 16, 2018

(54) SEQUENTIAL BEHAVIOR-BASED CONTENT DELIVERY

(71) Applicant: Samsung Electronics Co., Ltd., Gyeonggi-do (KR)

(72) Inventors: Abhishek Mukherji, Milpitas, CA (US); Vijay Srinivasan, San Jose, CA (US); Satheesh Sudarsan, San Jose, CA (US); Shalinder Singh Sidhu, Saratoga, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 220 days.

(21) Appl. No.: 14/741,362

(22) Filed: Jun. 16, 2015

(65) Prior Publication Data

US 2015/0373132 A1    Dec. 24, 2015

Related U.S. Application Data

(60) Provisional application No. 62/014,559, filed on Jun. 19, 2014.

(51) Int. Cl.
  *G06F 15/16* (2006.01)
  *H04L 29/08* (2006.01)
  *H04L 29/06* (2006.01)

(52) U.S. Cl.
  CPC .............. *H04L 67/22* (2013.01); *H04L 67/10* (2013.01); *H04L 67/18* (2013.01); *H04L 67/42* (2013.01)

(58) Field of Classification Search
  CPC ......... H04L 67/10; H04L 67/18; H04L 67/22; H04L 67/42
  See application file for complete search history.

(56) References Cited

U.S. PATENT DOCUMENTS

| | | | |
|---|---|---|---|
| 8,571,581 | B2 | 10/2013 | Lee et al. |
| 8,600,981 | B1 | 12/2013 | Chau et al. |
| 8,972,318 | B2 | 3/2015 | Prakash et al. |
| 9,026,139 | B2 | 5/2015 | Sen |
| 2004/0153373 | A1 | 8/2004 | Song et al. |

(Continued)

OTHER PUBLICATIONS

Aggarwal, C.C. et al., "A New Approach to Online Generation of Association Rules," [online] In IEEE Trans. on Knowledge and Data Engineering, vol. 13, No. 4, pp. 527-540, 2001, retrieved from the Internet: <http://dl.acm.org/citation.cfm?id=628147>, 2 pg.
Agrawal, R. et al., "Fast Algorithms for Mining Association Rules," [online] In Proc. of 20th Int'l Conf. on Very Large Data Bases (VLDG '94), 1994, retrieved from the Internet: <http://citeseerx.ist.psu.edu/viewdoc/download;jsessionid=A4D830E847C06BD55FD2EA735CB85E38?doi=10.1.1.219.6784&rep=rep1&type=pdf>, 32 pg.

(Continued)

*Primary Examiner* — Mohamed Wasel
(74) *Attorney, Agent, or Firm* — Cuenot, Forsythe & Kim, LLC

(57) ABSTRACT

Providing sequential behavior-based content may include detecting, using a processor, an event sequence involving at least one device of a user, wherein the event sequence includes a current event and a prior event, correlating, using the processor, the event sequence with a frequent sequential pattern selected from a plurality of frequent sequential patterns associated with the user, and predicting, using the processor, a next event for the user according to a plurality of ordered events specified by the selected frequent sequential pattern. Responsive to predicting the next event, content relating to the next event may be provided to the device using the processor.

20 Claims, 7 Drawing Sheets

(56) References Cited

U.S. PATENT DOCUMENTS

| | | | |
|---|---|---|---|
| 2006/0079201 A1* | 4/2006 | Chung | H04M 1/72563 455/410 |
| 2007/0018953 A1* | 1/2007 | Kipersztok | G06F 17/30643 345/156 |
| 2009/0239552 A1 | 9/2009 | Churchill et al. | |
| 2009/0287687 A1 | 11/2009 | Martire et al. | |
| 2009/0298483 A1* | 12/2009 | Bratu | G06Q 30/02 455/414.2 |
| 2010/0077484 A1 | 3/2010 | Paretti et al. | |
| 2010/0131453 A1* | 5/2010 | Firminger | G06N 5/04 706/54 |
| 2010/0131891 A1* | 5/2010 | Firminger | G06Q 10/10 715/810 |
| 2010/0179856 A1 | 7/2010 | Paretti et al. | |
| 2012/0101903 A1* | 4/2012 | Oh | G06Q 30/0269 705/14.66 |
| 2013/0024408 A1* | 1/2013 | Firminger | G06N 5/02 706/17 |
| 2013/0041976 A1 | 2/2013 | Hendricks et al. | |
| 2013/0073935 A1* | 3/2013 | Bertot | G06Q 30/0631 715/205 |
| 2013/0246595 A1 | 9/2013 | O'Donoghue et al. | |
| 2014/0128105 A1 | 5/2014 | Su et al. | |
| 2014/0136104 A1 | 5/2014 | Spears et al. | |
| 2014/0180760 A1 | 6/2014 | Karatzoglou | |
| 2014/0200036 A1 | 7/2014 | Egner et al. | |
| 2014/0244429 A1* | 8/2014 | Clayton | G06Q 30/0631 705/26.7 |
| 2014/0244488 A1* | 8/2014 | Kim | G06Q 20/123 705/39 |
| 2015/0007065 A1* | 1/2015 | Krishnamoorthy | H04L 67/22 715/760 |
| 2015/0058345 A1 | 2/2015 | Mishra et al. | |
| 2015/0105096 A1 | 4/2015 | Chowdhury et al. | |
| 2015/0106449 A1 | 4/2015 | Cherry et al. | |

OTHER PUBLICATIONS

Aharony, N. et al., "Social fMRI: Investigating and Shaping Social Mechanisms in the Real World," In Pervasive and Mobile Computing, vol. 7, No. 6, pp. 643-659, 2011.

"Android (Operating System)," [online] Wikipedia, the Free Encyclopedia, modified Jun. 16, 2015, retrieved from the Internet: <htlps://en.wikipedia.org/wiki/Android_(operating_system)>, 39 pg.

"Intelligent Personal Assistant," [online] Wikipedia, the Free Encyclopedia, modified Jun. 4, 2015, retrieved from the Internet: <https://en.wikipedia.org/wiki/Intelligent_personal_assistant>, 2 pg.

Lathia, N. et al., "Open Source Smartphone Libraries for Computational Social Science" In Proc. of 2nd ACM Int'l Workshop on Mobile Systems for Computational Social Science, Ubiquitous Computing Adjunct Publication (UbiComp'13), Sep. 8-12, 2013, ACM, pp. 911-919, 2013.

Nath, S., "ACE: Exploiting Correlation for Energy-Efficient and Continuous Context Sensing," In Proc. of 10th Int'l. Conf. on Mobile Systems, Applications and Services (MobiSys '12), pp. 29-42. ACM, 2012.

Pei, J. et al., "Mining Sequential Patterns by Pattern-growth: The Prefixspan Approach," In IEEE Trans. on Knowledge and Data Engineering, vol. 16, No. 11, pp. 1424-1440, (2004).

"Samsung Galazy S5," [online] Wikipedia, the Free Encyclopedia, modified Jun. 16, 2015, retrieved from the Internet: <https://en.wikipedia.org/wiki/Samsung_Galaxy_S5>, 9 pg.

"Mobileminer: Mining Your Frequent Patterns on Your Phone," In Proc. of 2014 ACM Int'l. Joint Conf. on Pervasive and Ubiquitous Computing (UbiComp '14), pp. 389-400. ACM, 2014.

* cited by examiner

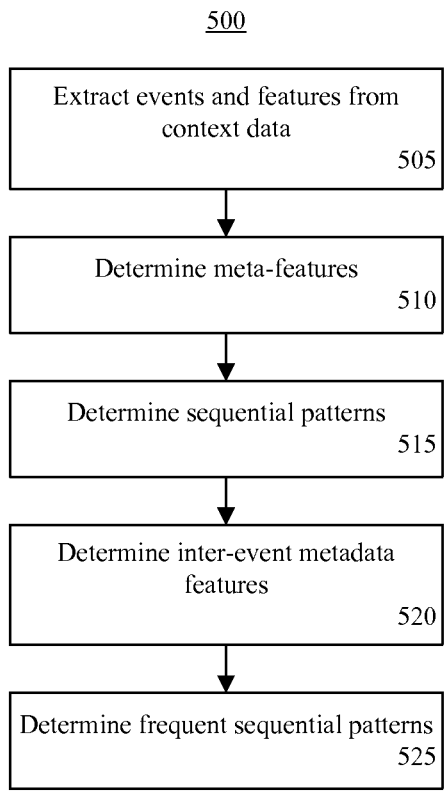
FIG. 5
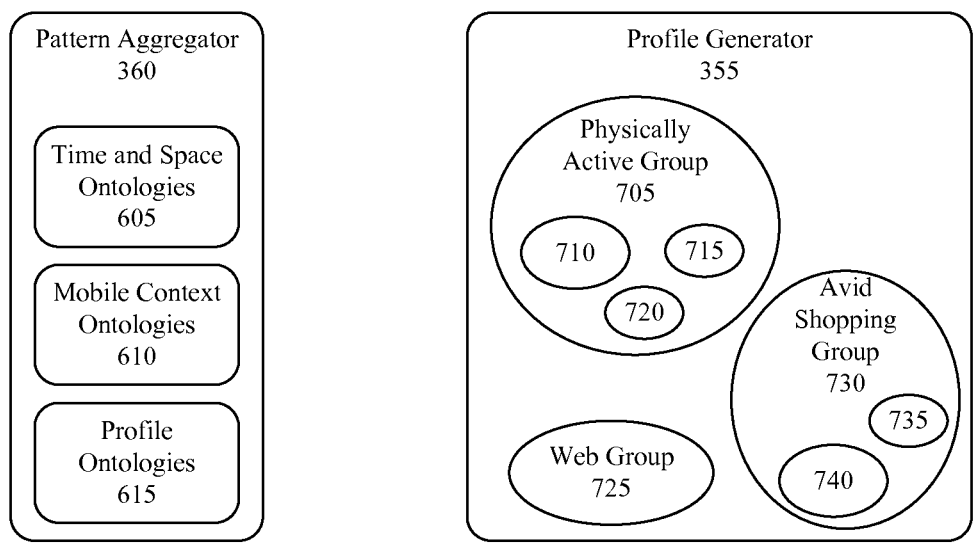
FIG. 6
FIG. 7

SEQUENTIAL BEHAVIOR-BASED CONTENT DELIVERY

CROSS-REFERENCE TO RELATED APPLICATIONS

This application claims the benefit of U.S. Provisional Patent Application No. 62/014,559 filed on Jun. 19, 2014, which is fully incorporated herein by reference.

TECHNICAL FIELD

Embodiments of this disclosure relate to providing content and, more particularly, to providing sequential behavior-based content.

BACKGROUND

Systems often provide content based upon a user's past behavior. Whether the system is utilized for selling movies, music, books, etc., the system typically stores a record of the user's activity, e.g., an online purchase, at a particular point in time. During a later interaction, the system may provide content, e.g., recommend a product and/or service, to the user that is similar to the user's prior purchase. Providing content that is actually useful and timely to the user, however, tends to be more complex than what may be accurately represented by a single event context learned from an isolated instance of user activity.

SUMMARY

A method may include detecting, using a processor, an event sequence involving at least one device of a user, wherein the event sequence includes a current event and a prior event, and correlating, using the processor, the event sequence with a frequent sequential pattern selected from a plurality of frequent sequential patterns associated with the user. The method may include predicting, using the processor, a next event for the user according to a plurality of ordered events specified by the selected frequent sequential pattern and, responsive to predicting the next event, providing content relating to the next event to the device using the processor.

A system includes a processor programmed to initiate executable operations. The executable operations may include detecting an event sequence involving at least one device of a user, wherein the event sequence includes a current event and a prior event, correlating the event sequence with a frequent sequential pattern selected from a plurality of frequent sequential patterns associated with the user, and predicting a next event for the user according to a plurality of ordered events specified by the selected frequent sequential pattern. The executable operations may also include, responsive to predicting the next event, providing content relating to the next event to the device.

A computer program product includes a computer readable storage medium having program code stored thereon. The program code is executable by a processor to perform a method. The method may include detecting an event sequence involving at least one device of a user, wherein the event sequence includes a current event and a prior event, correlating the event sequence with a frequent sequential pattern selected from a plurality of frequent sequential patterns associated with the user, and predicting a next event for the user according to a plurality of ordered events specified by the selected frequent sequential pattern. The method may also include, responsive to predicting the next event, providing content relating to the next event to the device.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 5 is a flow chart illustrating an exemplary method of generating frequent sequential patterns.

FIG. 6 is a block diagram illustrating operation of a pattern aggregator.

FIG. 7 is a block diagram illustrating operation of a profile generator.

DETAILED DESCRIPTION

Figure 1:
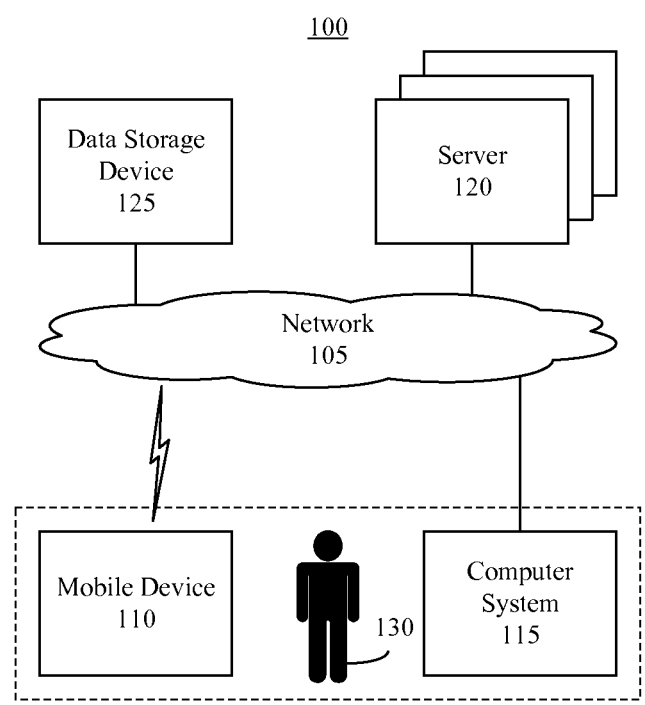
FIG. 1 is a pictorial representation of a network data processing system.

While the disclosure concludes with claims defining novel features, it is believed that the various features described herein will be better understood from a consideration of the description in conjunction with the drawings. The process(es) (e.g., methods), machine(s) (e.g., systems), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The embodiments of this disclosure relate to providing content and, more particularly, to providing sequential behavior-based content. In some cases, the content may be determined, at least in part, using crowd-sourcing. In accordance with the inventive arrangements disclosed herein, context data extending over time and specifying a plurality of different sequential events involving a user and/or one or more devices of the user may be collected and evaluated. From the context data, sequential patterns of ordered events relating to the user's behavior may be determined. The sequential patterns may be referred to as "longitudinal" since the patterns may specify a plurality of events separated by time. The events of a sequential pattern, being separated by time, may be said to be "intervaled."

In one aspect, an event sequence for the user may be detected. The event sequence may include a current event, e.g., as described by a current context for the user, and one or more prior events for the user. The sequential patterns for the user in combination with the event sequence for the user may be used to predict a next event in which the user may participate or engage. Based upon the predicted next event, content for the user may be generated. The content may relate to the predicted next event. For example, the content may be a suggestion to initiate the predicted next event, an incentive to initiate the predicted next event, a mechanism to reserve or otherwise initiate the predicted next event, or the like.

In some cases, the sequential patterns determined for the user may be shared with a server-based system. For example, the server-based system may be implemented as a so called "cloud computing" system. The sequential patterns may be used within a crowd-sourced pattern aggregation process and/or a crowd-sourced profile generation process. Results of the crowd-sourced pattern aggregation process and/or a crowd-sourced profile generation process may be used in determining the content.

In another aspect, the content may be determined using one or more criteria. Further, a modality in which the content is made available may be determined using one or more criteria. In one example, the content and/or modality of providing the content may be determined by correlating the user (e.g., sequential patterns of the user) with the content, a current context of the user, and/or the predicted next event of the user. In general, the content defines "what" is provided. The modality defines how and/or when the content is provided.

The inventive arrangements described herein allow a system to adapt to the lifestyle and/or surroundings of a user. The system may become proactive in assisting the user. The use of sequential patterns allows a system to learn context-specific behavior of the user. Sequential patterns capture the additional context relating to the order and/or timing of events as opposed to simply noting that one particular event has occurred in isolation. For example, sequential patterns may be indicative of whether a user is alone, accompanied by a friend, colleague, family, or the like. The system may determine content that accounts for the learned context-specific behavior of the user. As a brief example, a system may learn that a user stops for coffee most mornings on the way to work, and provide content in the form of an electronic discount coupon for coffee and/or for a particular coffee shop. The content may be provided as the user leaves his or her home rather than at some arbitrary time of the day when the content is not useful.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a pictorial representation of a network data processing system 100. One or more embodiments described herein may be implemented using network data processing system 100. For example, network data processing system 100 may be used to implement a sequential behavior-based content delivery system.

As pictured, network data processing system 100 may include one or more data processing systems communicatively linked to one another by a network 105. Exemplary data processing systems illustrated in FIG. 1 include a mobile device 110, a computer system 115, one or more servers 120, and an optional data storage device 125. Each of the data processing systems illustrated in FIG. 1 may be coupled to network 105. For purposes of illustration, mobile device 110 may be coupled to network 105 through a wireless communication link.

Network 105 is the medium used to provide communication links between mobile device 110, computer system 115, server 120, and/or data storage device 125. Network 105 may include connections, such as wired communication links, whether electrical or optical, and wireless communication links. Network 105 may be implemented as, or include, any of a variety of different communication technologies such as a Wide Area Network (WAN), a Local Area Network (LAN), a wireless network whether WAN or LAN, a mobile network, a Virtual Private Network (VPN), the Internet, the Public Switched Telephone Network (PSTN), or the like.

For purposes of illustration, a user 130 is associated with mobile device 110 and computer system 115. For example, mobile device 110 and computer system 115 may be used by user 130. Mobile device 110 may be a mobile phone, e.g., a smart phone, used and/or owned by user 130. Computer system 115 may be a desktop, tablet, laptop, or other personal computer system used and/or owned by user 130. Mobile device 110 may generate and store context data detailing usage of mobile device 110 by user 130. Computer system 115 may also generate and store context data detailing usage of computer system 115.

Context data may be any data that is generated, detected, and/or received by a device of the user. Context data, for example, is data that defines events in which a user participates, e.g., using his or her device, and/or defines the circumstances that form the setting for events. Context data may be specified by one or more logs. Exemplary context data that may be generated by a device may include, but is not limited to, location, which peripherals of a device are active, operational parameters of the peripherals, what application(s) are executed or occupy the foreground of a device, detected proximity of a device relative to one or more other devices, messages sent and/or received by the device, etc. Context data may also be received from one or more other sources communicatively linked with the device. Exemplary context data that may be received by a device may include, but is not limited to, weather conditions, traffic conditions, maps, points of interest (POIs), or the like.

In one aspect, the context data of mobile device 110 and/or computer system 115 may be synchronized and/or aggregated through server 120 and stored on one or more of the systems shown. For example, context data generated by mobile device 110 may be provided to, and/or synchronized with, computer system 115, server 120, and/or data storage device 125. Similarly, context data generated by computer system 115 may be provided to, and/or synchronized with, mobile device 110, server 120, and/or data storage device 125. It should be appreciated that user specific data such, e.g., a user profile specifying user-provided or volunteered data, may also be stored in mobile device 110, computer system 115, and/or server 120.

FIG. 1 is intended as an example and not as an architectural limitation of the illustrative embodiments described herein. It should be appreciated that network computing system 100 may include one or more additional data processing systems or fewer data processing systems than shown. For example, user 130 may utilize one or more additional peripheral devices such as a smart watch that may be used in conjunction with mobile device 110 and/or computer system 115. In another example, server 120 and/or data storage device 125 may be representative of a cloud computing infrastructure.

Figure 2:
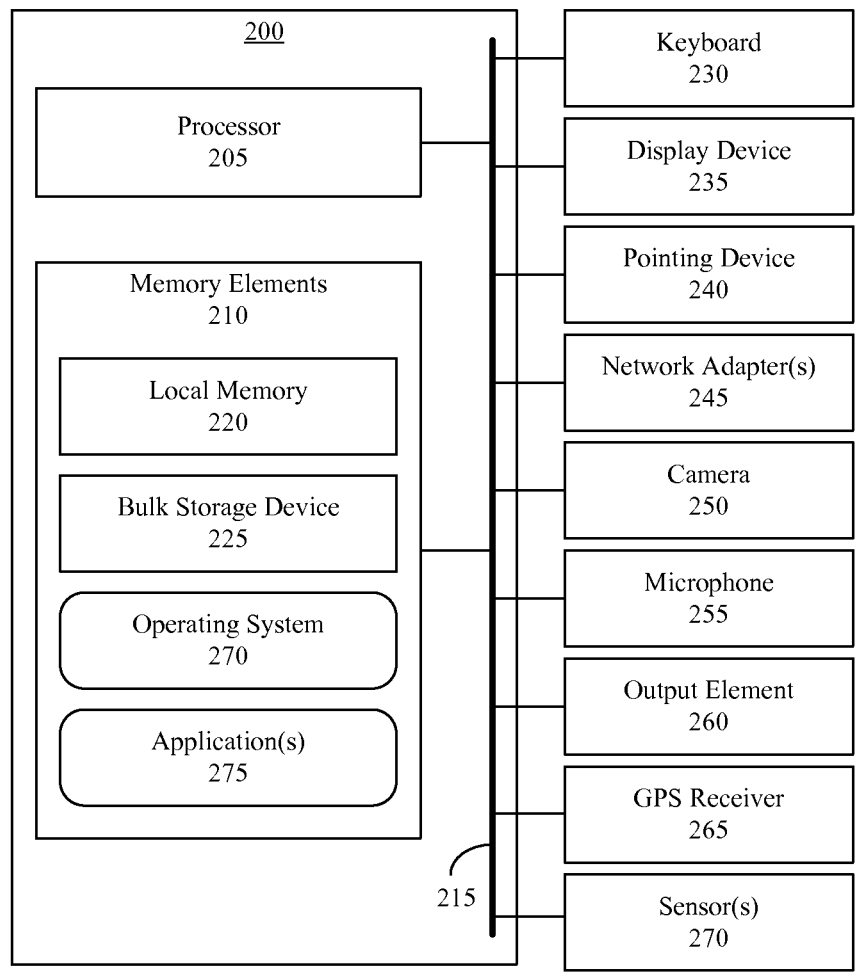
FIG. 2 is an exemplary architecture for a data processing system.

FIG. 2 is an exemplary architecture 200 for a data processing system. Architecture 200 may be used to implement any of a variety of different devices. Architecture 200 may be used to implement systems and/or devices that include a processor and memory and that are capable of performing the operations described within this disclosure. For example, referring to FIG. 1, architecture 200 may be used to implement mobile device 110, computer system 115, and/or server 120. In some cases, the particular device implemented using architecture 200 may include fewer components or more components than illustrated in FIG. 2. Further, the particular operating system and/or application(s) included may vary.

As pictured, architecture 200 includes at least one processor, e.g., a central processing unit (CPU), 205 coupled to memory elements 210 through a system bus 215 or other suitable circuitry. Architecture 200 stores program code within memory elements 210, which are an example of computer readable storage media. Processor 205 executes the program code accessed from memory elements 210 via system bus 215. In one aspect, memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 may also include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 may optionally be coupled to architecture 200. In some cases, one or more of the I/O devices may be combined as in the case where a touchscreen is used as display device 235. In that case, display device 235 may also implement keyboard 230 and/or pointing device 240.

The I/O devices may include one or more network adapters 245 that may be coupled to architecture 200 to enable architecture 200 to become coupled to other systems, computer systems, remote printers, and/or remote storage devices through intervening private or public networks and/or through direct connections (e.g., peer-to-peer connections). Modems, cable modems, Ethernet cards, and wireless transceivers (e.g., wireless radios) are examples of different types of network adapter 245 that may be used with architecture 200. Depending upon the particular device implemented with architecture 200, the specific type of network adapter, or network adapters as the case may be, will vary.

The I/O devices may also include a camera 250, a microphone 255, and one or more output elements 260. In one aspect, output element 260 may be a speaker. In another aspect, output element 260 may be a motor configured to vibrate a device using architecture 200. It should be appreciated that architecture 200 may include both a speaker and a motor as output elements. The I/O devices may also include a global positioning system (GPS) receiver 265. One or more additional sensors 270 may also be coupled to architecture 200. Examples of sensors 270 may include, but are not limited to, accelerometers, gyroscopes, light sensors, biological and/or medical sensors, and the like. Examples of biological sensors may include heartrate sensors, body temperature sensors, etc.

One or more of the various I/O devices described, for example, keyboard 230, pointing device 240, network adapter(s) 245, camera 250, microphone 255, GPS receiver 265, sensors 270, etc., may be referred to as "sensing devices." The various I/O devices described herein may be coupled to architecture 200 either directly or through intervening controllers. An amplifier or other driver circuit may be used to couple output element 260 to architecture 200, e.g., in the case where output element 260 is a speaker or other audio output device.

As pictured in FIG. 2, memory elements 210 store an operating system 270 and one or more applications 275. In one aspect, operating system 270 and application(s) 275, being implemented in the form of executable program code, are executed by architecture 200. As such, operating system 270 and application(s) 275 may be considered an integrated part of architecture 200. In another aspect, operating system 270 and application(s) 275 may be combined into a single application or program. Operating system 270, application(s) 275, and any data items used, generated, and/or operated upon by architecture 200 are functional data structures that impart functionality when employed as part of a system implemented using architecture 200. For example, a device and/or system implemented using architecture 200 or a combination of such devices and/or systems may be programmed to initiate executable operations as described within this disclosure.

In one aspect, data generated by one or more or all of the sensing devices may be stored as, or as part of, context data in memory elements 210. Processor 205, in executing application 275, may process the context data to determine frequent sequential patterns, a detected event sequence, compare the aforementioned items, determine content and a delivery modality of the content.

Figure 3:
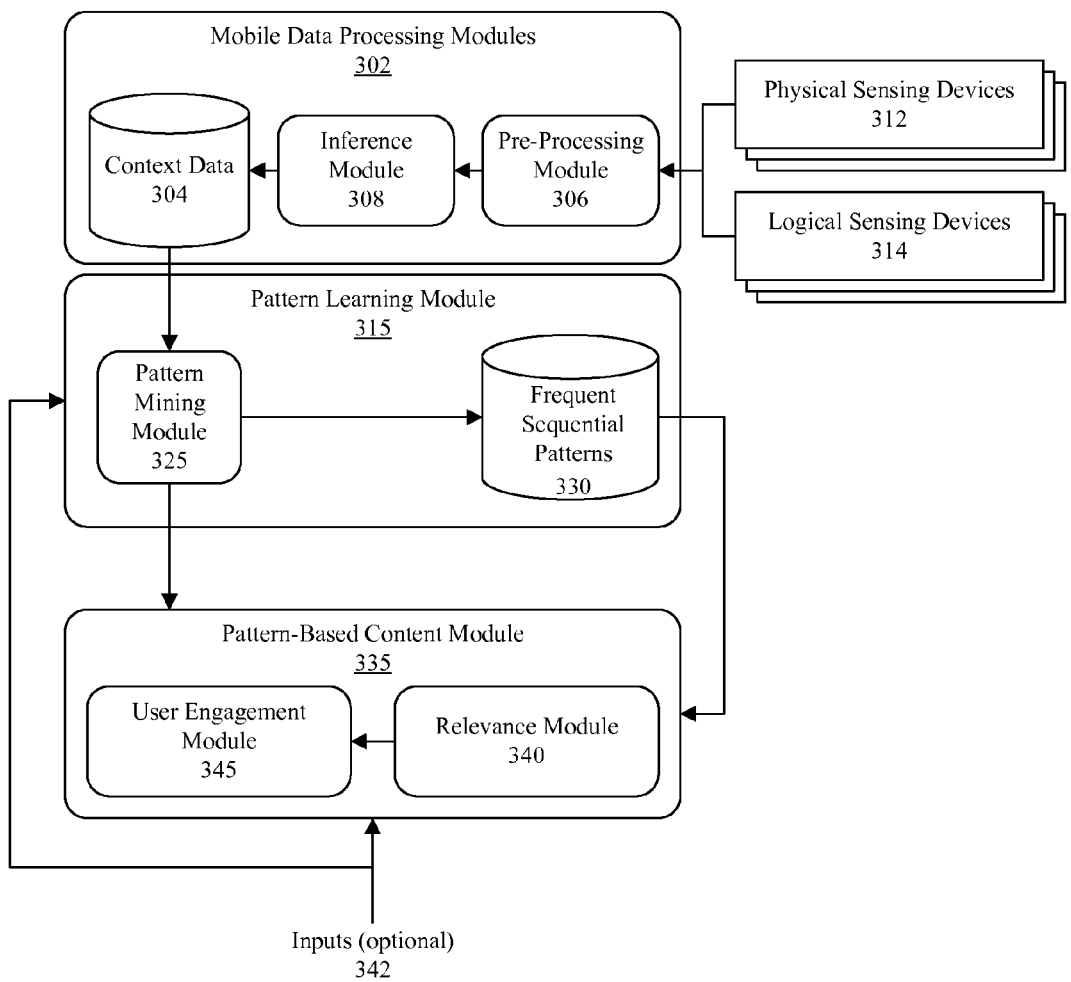
FIG. 3 is a block diagram illustrating an exemplary implementation of mobile device of a sequential behavior-based content delivery system.

FIG. 3 is a block diagram illustrating an exemplary implementation of mobile device 110 of a sequential behavior-based content delivery system. In one embodiment, mobile device 110 may be implemented using an architecture the same as or similar to that of architecture 200 of FIG. 2. FIG. 3 illustrates exemplary software modules that may be executed within mobile device 110.

As pictured, mobile device 110 may include mobile data processing modules 302, a pattern learning module 315, and a pattern-based content module 335. Mobile data processing modules 302 may include a pre-processing module 306, an inference module 308, and content data 302. Pattern learning module 315 may include a pattern mining module 325 and frequent sequential patterns 330. Pattern-based content module 335 may include a relevance module 340 and a user engagement module 345.

Mobile device 110, as discussed, may include one or more sensing devices as described with reference to FIG. 2. In one aspect, the sensing devices may be organized into a group of physical sensing devices 312 and a group of logical sensing devices 314. For purposes of illustration, exemplary physical sensing devices 312 may include, but are not limited to, the GPS receiver, accelerometer, battery level sensing devices, wireless radios (Wi-Fi, Bluetooth, etc.), microphones or other audio sensing devices, light sensing devices, cameras, and the like. Exemplary logical sensing devices 314 may include, but are not limited to, applications, email(s), text message(s), Short Message Service (SMS) message(s), phone calls, and the like.

Pre-processing module 306 may receive data from physical sensing devices 312 and/or logical sensing devices 314. In one aspect, pre-processing module 306 may perform operations such as interpolation, extrapolation, data cleaning, and the like. In another aspect, pre-processing module 306 may control and/or interact with physical sensing devices 312 and/or logical sensing devices 314 (e.g., the processor) to control the when and/or how often data is obtained from the various sensing devices. For example, pre-processing module 306 may receive data relating to phone calls, SMS messages, and the like when such messages are sent and/or received. In other cases, pre-processing module 306 may request data or otherwise obtain data at specified time intervals. For instance, pre-processing module 306 may obtain Wi-Fi and/or Bluetooth connectivity data indicating a particular device and/or network a wireless radio is in communication with every minute, every several minutes, or the like. Similarly, location may be determined at specified time intervals (e.g., a specified frequency). Pre-processing module 306 may control data collection from physical sensing devices 312 and/or logical sensing devices 314.

Inference module 308 may receive sensing device data output from pre-processing module 306. Inference module 308 may determine low level inferences from the received sensing device data. As an example, inference module 308 may determine an inference that a user is walking, running, biking, exercising, or the like based upon received accelerometer data. Inference module 308 may determine an inference that a user is with one or more other users such as friends, family, etc., based upon co-location of the user with the other users and/or Bluetooth connectivity data of mobile device 110 with other known devices showing proximity to such known devices. In another example, inference module 308 may determine an inference that a user is at a restaurant or at a bowling alley using GPS location and accelerometer data. Electronic wallet data, email receipt(s), and the like may be used to determine an inference that a user is shopping. Calendar entries and audio analysis may be used to determine an inference that a user is involved in a meeting. The state of the screen being either on or off may be used by inference module 308 to determine mobile usage or smart watch usage. Television usage may be inferred from audio captured by mobile device 110.

The sensing device data, as processed by pre-processing module 306 and/or inference module 308 may be stored as context data 302 within mobile device 110. In one aspect, context data 302 may be stored in the form of one or more logs. In some cases, the logs may include a log of time and date stamped inferences. In other cases, the inferences may be annotated and time and date stamped within the context data, e.g., annotated in one of more other ones of the logs described below.

For example, mobile device 110 may generate a text message usage log specifying sent and/or received texts. Each entry may specify a time and date, whether the text message was outgoing or incoming, the sender and/or recipient(s) of the text message, etc. Mobile device 110 may generate an electronic mail usage log where each entry may specify a time and date, whether the subject email was incoming or outgoing, the sender and/or recipient(s) of the email, etc. Mobile device 110 may generate an application usage log specifying applications used by the user. Mobile device 110 may generate a device-payment log specifying purchases made using the device, and the like. Mobile device 110 may generate a network connection log (e.g., a WiFi or 802.11x compliant network connection log) where entries are made periodically, responsive to an event such as joining or leaving a network, or from time-to-time indicating a time and date and a network to which the device is connected. Mobile device 110 may generate an accelerometer data log. Mobile device 110 may generate a GPS or location log. Mobile device 110 may generate a Bluetooth device or other near field device connection log, a battery usage log, an audio detection log, a light detection log, biological sensor data log (e.g., a heartrate log, etc.), and the like.

A log may be stored as a file, whether a text file, a structured or hierarchical file, e.g., a markup language file or a database file, or the like. In general, context data 302 may be generated by a processor creating entries in a log where each entry may specify a time and date stamp. Each entry of a log, for example, may include data detected by the particular sensing device associated with the log. Entries may be made periodically, e.g., sampled at specified time intervals, from time-to-time, or responsive to predetermined events such as joining a network, leaving a network, receiving a message, sending a message, establishing a connection with another device, sensing that another device is within a predetermined distance, or the like. Data collection may be conducted under control of pre-processing module 306.

Pattern learning module 315 may be configured to determine one or more frequent sequential patterns 330 from context data 302 for a user. In one aspect, pattern learning module 315 may be implemented to execute as an offline learning module. For example, pattern learning module 315 may be configured to execute while mobile device 110 is idle, charging, or the like. In one exemplary implementation, pattern learning module 315 may be implemented using an unsupervised pattern determination and/or clustering technique.

As noted, context data 302 may include data obtained from physical sensing devices 312 and/or logical sensing devices 314. It should be appreciated, however, that context data 302 may also include additional information that may be obtained from an external source. For example, context data may include weather data for a particular date, time, and location, traffic conditions for a particular date, time, and location, and the like. This additional data may be received as inputs 342 from server 120 and/or one or more other external sources. The additional data may be stored in one or more of the logs or within a separate data structure in memory once received. The additional data may also be time and date stamped in order to correlate the received data with other items of context data 302.

Pattern mining module 325 may be configured to analyze context data 302 for sequential patterns of events and determine one or more sequential patterns that meet one or more predetermined criteria. For example, pattern mining module 325 may be configured to determine one or more sequential patterns that occur frequently. Sequential patterns determined, by pattern mining module 325, to occur frequently may be stored as frequent sequential patterns 330. In another aspect, pattern mining module 325 also may analyze context data 302 to detect an event sequence. The detection of an event sequence, as described herein, may be performed in real time.

In illustration, in analyzing context data 302, pattern mining module 325 may determine a first sequential pattern for a user that may specify an ordered sequence of one or more events relating to application usage over a period of time during a day. The sequence of application usage events may be application 1, application 2, and application 5. Another exemplary sequential pattern of events may be a listing of a plurality of different ordered locations visited by the user such as work, grocery store, home. Another exemplary sequential pattern may include a mixture of ordered events of differing type such as call Alice, go to work, go to café with Alice, and go home. Pattern mining module 325 may identify which of the sequential patterns meet the predetermined criteria. Pattern mining module 325 may identify the sequential patterns meeting the predetermined criteria as frequent sequential patterns 330 and store the frequent sequential patterns 330 within a memory of mobile device 110.

In another embodiment, pattern mining module 325 may obtain global data for one or more events of frequent sequential patterns 330 as part of inputs 342. As illustrated, inputs 342 may be provided to pattern mining module 325. For example, pattern mining module 325 may obtain weather or traffic information and use the received global data as context data to form the sequential patterns. In illustration, having received global data, pattern mining module 325 may create more sequential patterns such as {(Weekend Morning, Rainy, At Home, Browse Deals)→(Weekend Afternoon, In Mall, Rainy, Shopping)→(Weekend Afternoon, In Mall, Rainy, Eating Lunch At Food Court)}. Another exemplary sequential pattern that incorporates global data may include {(Weekend Morning, Sunny, At Home, Browse Biking Routes)→(Weekend Afternoon, Outdoors, Sunny, Biking)→(Weekend Afternoon, Outdoors, Sunny, BBQ Lunch)}.

In one aspect, mobile device 110 may provide frequent sequential patterns 330 to a server such as server 120. Mobile device 110 may anonymize frequent sequential patterns 330 prior to sending the data to server 110. It should be appreciated that data may be anonymized using any of a variety of known techniques such as, for example, one-way hashing or the like. Mobile device 110 may send frequent sequential patterns 330 to server 120 from time-to-time, periodically, or the like. Sending frequent sequential patterns 330 reduces the amount of data sent to server 120, thereby requiring less bandwidth and less time compared to sending partial or complete versions of context data 302. It should be appreciated, however, that partial and/or complete versions of context data 302 may be sent by mobile device 110 to server 120 other embodiments.

Pattern-based content module 335 may be configured to determine content for a user. In one aspect, pattern-based content module 335 may utilize an unsupervised learning technique for determining content. Pattern-based content module 335 may be configured to make the content available to the user. Pattern-based content module 335 may also determine the modality used to make the content available to a device of the user. It should be appreciated that the modality that is selected may include a selection of a particular device of the user from a plurality of different devices, an application on the device, a time that the content may be made available, and any particular mechanism(s) of the device used to alert the user of the availability of the content.

In one aspect, the content may include executable instructions that, when received by a device, may be executed to perform one or more executable operations. The executable operations may include, but are not limited to, executing an application and performing an action through the executed application, downloading additional data and/or applications, mapping routes, providing incentives, providing recommendations, or the like.

As pictured, pattern-based content module 335 may include a relevance module 340 and a user engagement module 345. Relevance module 340 may utilize multiple criteria to determine the content. Relevance module 340 may receive a plurality of different inputs and determine content from the received inputs. In one aspect, the received inputs may include a detected event sequence within mobile device 110 (e.g., as may be determined by pattern mining module 325), frequent sequential patterns 330, and/or inputs 342. The event sequence may include a current event and one or more prior events that may be correlated with frequent sequential patterns 330 and/or one or more other ones of the inputs.

In one embodiment, relevance module 340 may receive inputs 342 from server 120 specifying crowd-sourced data. The crowd sourced data may include one or more crowd-sourced user profiles and/or one or more crowd-sourced frequent sequential patterns. Relevance module 340 also may receive global data and/or map data from server 120 and/or another external source.

Relevance module 340 may generate content based upon the received inputs. It should be appreciated that in the event that inputs are not received from server 120, mobile device 110 may generate the content independently of any other data processing system such as server 120 or other cloud-based service, e.g., without inputs 342. In cases where mobile device 110 does receive inputs 342 from server 120 or another external source, mobile device 110 may determine content based, at least in part, upon crowd sourced data, frequent sequential patterns 330, the detected event sequence in mobile device 110, global data, and/or map data. In one aspect, in the case where sequential patterns 330 incorporate global data, pattern-based content module 335 may also perform a matching of the global data within frequent sequential patterns with global data that may be part of a detected event sequence.

In another example, global data and map data may be obtained using locally executing applications on mobile device 110 that may be configured to query one or more different sources of data from time-to-time, periodically, or the like and store the global data and/or map data locally within mobile device 110. For example, mobile device 110 may execute a weather application or service that obtains weather information from an external source other than server 120 from time-to-time, periodically, or the like throughout the day. In another example, mobile device 110 may execute a traffic or map application or service that obtains congestion and/or map data from time-to-time, periodically, or the like. Regardless of how the global data and/or map data may be obtained, in one aspect, mobile device 110 may store the global data and/or map data in a local data store, e.g., as one or more logs.

User engagement module 345 is configured to determine the modality in which content is made available. Operation of modality module 345 is described in greater detail within this specification. In general, engagement module 345 may determine when and how content determined by relevance module 340 may be provided or otherwise delivered. In one example, user engagement module 345 may utilize a current context of the user and/or the predicted next event to determine the delivery modality.

Figure 4:
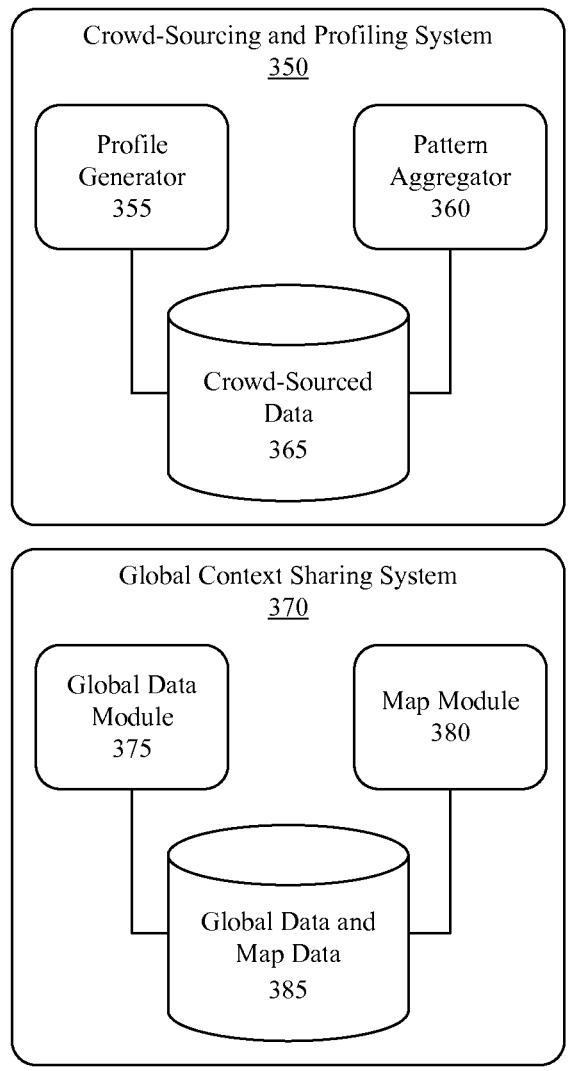
FIG. 4 is a block diagram illustrating an exemplary implementation of a server of a sequential behavior-based content delivery system.

FIG. 4 is a block diagram illustrating an exemplary implementation of server 120 of a sequential behavior-based content delivery system. In one aspect, server 120 may represent a cloud computing infrastructure. Server 120 may include a crowd-sourcing and profiling system 350 and a global context sharing system 370. Crowd-sourcing and profiling system 350 may include a profile generator 355, a pattern aggregator 360, and crowd-sourced data 365. Global context sharing system 370 may include a global data module 375, a map module 380, and global data and map data 385.

In one embodiment, crowd-sourcing and profiling system 350 may be executed as an offline learning system. For example, crowd-sourcing and profiling system 350 may be implemented using an unsupervised pattern determination and/or clustering technique. Profile generator 355 may generate one or more crowd-sourced user profiles from crowd-sourced sequential patterns (e.g., crowd-sourced frequent sequential patterns) stored in crowd-sourced data 365. For example, profile generator 355 may perform a clustering technique on the crowd-sourced sequential patterns to generate the crowd-sourced profiles. The crowd-sourced profiles may organize the crowd-sourced sequential patterns according to one or more different ontological user groups as stored in crowd-sourced data 365. Exemplary ontological user groups, or ontologies, may include, but are not limited to, occupation, hobby, demographics, etc.

For example, profile generator 355 may implement an unsupervised hierarchical clustering technique to aggregate crowd-sourced sequential patterns such that each cluster of sequential patterns defines an ontological user group. In one aspect, the ontological user groups may be determined according to the particular events contained within the sequential patterns. In some cases, the sequential patterns may include, or be associated with, one or more inferences as previously described.

For example, sequential patterns including events relating to physical activity, sports, and the like may be named as "physically active" or a particular subset of physically active users. In another example, while the sequential patterns may be anonymized, the sequential patterns still may be associated with general, non-identifying information such as a profession, one or more items of demographic data, or a hobby that was initially specified by the particular user from which the sequential pattern was obtained. In that case, profile generator 355 may name a particular cluster according to a dominant characteristic or common characteristic of the sequential patterns of the cluster (e.g., a profession, hobby, item of demographic data such as age, etc.).

The clustering described may result in one or more user profiles with potentially arbitrary semantic meaning and/or user profiles of users that are tightly coupled together for use by user engagement module 345. In another aspect, semantic meaning may be added to some or all of the user ontological groups manually. For example, active gym goers, athletes, and bicyclists may be jointly classified as physically active people. Similarly, there may be several categories of avid shoppers.

In another embodiment, profile generator 355 may determine one or more crowd-sourced user profiles from crowd-sourced data 365 to which a user may belong by comparing frequent sequential patterns 330 with the crowd-sourced user profiles. For example, profile generator 355 may determine that a particular user belongs to one or more different user profiles based upon a matching of frequent sequential patterns 330 with crowd-sourced frequent sequential patterns as organized in the ontological user groups within crowd-sourced data 365. Profile generator 355 may send any results from processing frequent sequential patterns 330 to mobile device 110. In one example, profile generator 355 may send crowd-based user profiles correlated with frequent sequential patterns 330 to mobile device 110 from time-to-time, periodically, or upon request. In another example, profile generator 355 may send crowd-based user profiles to mobile device 110 that may be utilized by relevance module 340 and/or user engagement module 345.

Pattern aggregator 360 may evaluate frequent sequential patterns 330 and/or crowd-sourced frequent sequential patterns and identify macro patterns. For example, a plurality of frequent sequential patterns collected from a plurality of different users may include a first sequence of {Biking→Juice Bar}; a second sequence of {Running→Juice Bar}; and a third sequence of {Gym→Juice Bar}. Pattern aggregator 360 may be configured to identify macro-level sequential patterns such as {Physical Activity→Juice Bar} from the one or more lower level, e.g., more specific, sequential patterns noted above. In another example, the macro-level event of "physical activity" may be further classified through an ontological classification system to be either indoor or outdoor. Thus, "biking" and "running" may be identified as "outdoor physical activities," while "gym" is identified as an "indoor physical activity."

Pattern aggregator 360 may compare frequent sequential patterns 330 with the crowd-sourced patterns to determine whether one or more of the frequent sequential patterns 330 fits or matches one or more of the macro-level sequential patterns. In one aspect, pattern aggregator 360 may provide macro-level patterns and/or crowd-sourced sequential patterns determined to correlate or match frequent sequential patterns 330 to mobile device 110. In another aspect, pattern aggregator 360 may provide macro-level patterns and/or crowd-sourced sequential patterns to mobile device 110 for use by relevance module 340 and/or user engagement module 345. Since crowd-sourcing and profiling system 350 may be implemented as an offline system, the results described may be provided to mobile device 110 from time-to-time, periodically, and/or responsive to a request or query from mobile device 110.

In another example, profile generator 355 may determine that two different users with common interests may be categorized under a common or same ontological user group, e.g., a profile. Referring to the above example, pattern aggregator 360 may determine macro-level crowd-based sequential patterns. Profile generator 355 may determine that users exhibiting the macro-level sequential pattern {Physical Activity→Juice Bar} should belong to a same ontological user group. As discussed, the ontological user groups may be hierarchical. In illustration, a group of users with a first frequent sequential pattern of {Work→Grocery→Mall→Restaurant→Home} may also qualify for a second frequent sequential pattern {Mall→Restaurant→Home}, such that the second frequent sequential pattern is a subset of the first frequent sequential pattern. Similarly, a third frequent sequential pattern {Work→Grocery→Mall→Restaurant} and a fourth frequent sequential pattern {Mall→Restaurant} each may be a subset of the first frequent sequential pattern. Thus, users qualifying for the first frequent sequential pattern may also qualify for the subsets thereof. A hierarchy of profiles may be generated in this manner.

Global context sharing system 370 may be implemented as a real time system. Global context and sharing system 370 may include a global data module 375, a map module 380, and global data and map data 385. Global data module 375 may retrieve global data from global data and map data 385 based upon a current context of the user as may be provided from mobile device 110 to server 120. For example, mobile device 110 may provide a current context to server 120 as part of a query seeking global data and/or map data. Global data may include, but is not limited to, weather, traffic, location specific congestion (e.g., the congestion in a shopping mall), parking area or facility, and the like. In one aspect, global data stored in global data and map data 385 may be obtained through crowd sourcing. In another aspect, global data may be obtained by accessing one or more services, e.g., Web-based services. Global data module 375 may retrieve items of global data based upon the user's current context and provide the global data to mobile device 110.

Map module 380 may retrieve map data from global data and map data 385 based upon the current context of the user as provided from mobile device 110 to server 120. Maps may include indoor maps and/or outdoor maps. The maps may include POIs. Map module 380 may retrieve one or more maps based upon the user's current context and provide the maps to mobile device 110. In one aspect, global data and map data 385 may include any of a variety of publicly available information and may be provided to mobile device 110 from time-to-time, periodically, and/or responsive to a query from mobile device 110.

FIG. 5 is a flow chart illustrating an exemplary method 500 of generating frequent sequential patterns. Method 500 may be performed by a data processing system (system). In one aspect, method 500 may be performed by a mobile device executing mobile data processing modules 302 and pattern learning module 315 as described with reference to FIG. 3. In another aspect, the data processing system may be implemented as a server that is configured to receive context data, e.g., logs, and perform the operations described with reference to FIG. 5.

In block 505, the system may extract events and features from context data. As noted, context data may be specified within logs stored in the system. The logs may specify data collected over a period of several days, a week, weeks, a month, etc. In one example, a call log may include one or more entries where each entry includes a Contact Address field, a Type field, and a time and date stamp. In another example, an application usage log may include entries where each entry specifies the name of the foreground application and a time and date stamp. The application usage log may be sampled, e.g., an entry created, at a rate of every minute, every 5 minutes, or the like. In one example, the system may operate on consecutive entries that indicate no change in the foreground application usage and compress the entries together to create application usage events. A location log may include latitude and longitude values sampled at a rate of every 30 seconds, every minute, every 5 minutes, or the like.

The system may extract events such as the application used and the time and date used. The system further may extract features. For example, the system may determine the time of the first entry indicating use of a particular application and the time of the last consecutive entry of use of the application. The system may determine that an application listed in three consecutive entries spaced 5 minutes apart, for example, is in use from the time of the first entry to the time of the last consecutive entry for the application. Table 1 below illustrates an example of events and features extracted from context data. Each event, for example, may be determined from one or more of the entries in an application usage log. For purposes of illustration, the times are noted using 24 hour time notation.

TABLE 1

| Event | Application | Date | Time Span Feature |
| --- | --- | --- | --- |
| 1 | Application 1 | May 5, 2015 | 06:30-06:45 |
| 2 | Application 2 | May 5, 2015 | 07:00-07:30 |
| 3 | Application 3 | May 5, 2015 | 09:50-10:05 |
| 4 | Application 4 | May 5, 2015 | 10:05-10:20 |
| 5 | Application 5 | May 5, 2015 | 12:20-12:35 |

Other logs such as the call log and the messaging log, e.g., an SMS log, etc., may undergo similar processing to form events as described. In the case of a call log, for example, calls may be specified with further details such as call type (incoming, outgoing), whether the call went to voicemail or was missed, call start time, call end time, and call duration. In one aspect, events across multiple, different logs may be aggregated and placed in date/time order for purposes of evaluation and pattern identification.

In block 510, the system may determine meta-features for the events. The system may analyze the extracted events and features and determine the meta-features. The meta-features may facilitate further classification and semantic understanding of the extracted events. Using the time and date stamp value, for example, the system may generate time features such as HourOfDay, SegmentofDay (morning, afternoon, evening, night), DayofWeek (Monday, Tuesday, Wednesday, Thursday, Friday, Saturday, Sunday), and DayType (Weekday, Weekend Day).

For example, given the data in Table 1 above, the system may determine whether the extracted events occurred on a weekday or a weekend day. The system may determine whether the event occurred in the morning, the afternoon, the evening, or at night. The system may determine the duration of each event. Table 2 below illustrates exemplary meta-features that may be determined for the events and associated with the respective events.

TABLE 2

| Event | Application | Date | Time Span Feature | Meta-Features |
| --- | --- | --- | --- | --- |
| 1 | Application 1 | May 5, 2015 | 06:30-06:45 | Weekday, morning, 15 minutes |
| 2 | Application 2 | May 5, 2015 | 07:00-07:30 | Weekday, morning, 30 minutes |
| 3 | Application 3 | May 5, 2015 | 09:50-10:05 | Weekday, morning, 15 minutes |
| 4 | Application 4 | May 5, 2015 | 10:05-10:20 | Weekday, morning, 15 minutes |
| 5 | Application 5 | May 5, 2015 | 12:20-12:35 | Weekday, afternoon, 15 minutes |

Each set of events from the logs may be processed to generate relevant meta-features. For example, the system may perform a mapping of latitude and longitude to place identifiers as specified in mapping data. In illustration, the coordinate (latitude$_{work}$, longitude$_{work}$) may map to a user's work. The place mappings may specified explicitly by a user, e.g., by tagging locations or addresses in one's electronic address book as "Home," "Work," "Mall," etc., or through an automated data mining or location clustering process.

In block 515, the system may determine sequential patterns. In one example, the system may determine a database of sequential patterns. For example, $E=\{e_1, e_2, \ldots, e_n\}$ may be a set of all events. Exemplary events determined from context data may include Location:PlaceID:Home, Call:Contact:X, and App:AppName:MapApp. In one embodiment, an event may be expressed as an event set where the event set may be denoted as E. An event set, for example, may be an event in combination with one or more attributes describing the event. For example, {Call:Contact:X, time:DayType:Weekday, time:SegmentofDay:Evening} may be an event expressed as an event set. The event Call:Contact:X indicates the event of calling a contact identified as "X." The attributes in this example are time:DayType:Weekday indicating that the call took place on a weekday and time:SegmentofDay:Evening indicating that the call took place in the evening.

In a further embodiment, a sequential pattern S may be denoted as $\{E_1 \rightarrow E_2 \rightarrow \ldots E_t\}$, where $E_j$ is an event set. In one exemplary implementation, an item e may be limited to occurring at most one time in an event set of a sequential pattern. This condition may eliminate and/or reduce redundancy or ambiguity to prevent more than one same type of attribute to be included in an event set. In other examples, the restriction need not be applied. It should be appreciated, however, that an item e may occur multiple times in different event sets of a sequential pattern. The number of event sets within a sequential pattern defines the length of the sequential pattern where a sequential pattern with E event sets may be called an E-sequence.

In one aspect, the sequential pattern database may be a set of tuples <S_id, S> where S_id is the sequence identifier and S is the sequential pattern. For the purpose of generating the sequential pattern database using context data, the system may use a sequence length parameter that denotes the length of the sequential pattern S in each tuple. The system may iterate over the events together with their time attributes. In each iteration, the system may slide, or move, 1 event to form a sequential pattern that is placed into the sequential pattern database. An example of generating the sequential pattern database with a sequence length of 3 and sliding by 1 event at a time is depicted in Table 3. The sequence length may play a role in determining the execution time of the sequential pattern mining process where the larger the sequence length, the longer the execution time. A tuple <S_id, S> may be said to contain a sequence $S_i$, if $S_i$ is a subsequence of S. Further, the support of a sequential pattern $S_i$ may be the number of tuples in the sequence database containing $S_i$. In one aspect, those sequential patterns determined to have a support value exceeding a support threshold may be determined to be frequent sequential patterns.

In illustration, and with reference to Table 3 below, the system may have the sequence length set to a value of 3. The system may select the first three events of Table 2, i.e., events 1, 2, and 3 as a first sequential pattern. The system may increment, e.g., slide by one event, to select events 2, 3, and 4 as the second sequential pattern. The system may increment again to select events 3, 4, and 5 as a third sequential pattern. Table 3 below illustrates exemplary sequential patterns that may be developed.

TABLE 3

| Sequential Pattern No. (S_id) | Sequential Pattern (Sequence) |
| --- | --- |
| 1 | (Application 1, [06:30-06:45]) → (Application 2, [07:00-07:30]) → (Application 3, [09:50-10:05]) |

TABLE 3-continued

| Sequential Pattern No. (S_id) | Sequential Pattern (Sequence) |
| --- | --- |
| 2 | (Application 2, [07:00-07:30]) → (Application 3, [09:50-10:05]) → (Application 4, [10:05-10:20]) |
| 3 | (Application 3, [09:50-10:05]) → (Application 4, [10:15-10:20]) → (Application 5, [12:20-12:35]) |

In one aspect, the sequential patterns may be represented or stored as prefix tree representations. In another aspect, the sequential patterns may be represented or stored as finite state machines, as Markov Models, or the like. Other probabilistic models may be used for purpose of compact storage and efficient searching and/or matching.

In block 520, the system may determine inter-event metadata features. For example, the system may further process the sequential patterns to determine metadata describing the transition between consecutive events in a same sequential pattern. One example of inter-event metadata is the amount of time between two consecutive events in a same sequential pattern. As shown, the amount of time between events in each sequential pattern is added. The system may add the inter-event metadata to the sequential patterns as illustrated below in Table 4.

TABLE 4

| Sequential Pattern No. (S_id) | Sequential Pattern (Sequence) with Inter-Event Metadata |
| --- | --- |
| 1 | (Application 1, [06:30-06:45]) → (15 minutes) → (Application 2, [07:00-07:30]) → (185 minutes) → (Application 3, [09:50-10:05]) |
| 2 | (Application 2, [07:00-07:30]) → (140 minutes) → (Application 3, [09:50-10:05]) → (0 minutes) → (Application 4, [10:05-10:20]) |
| 3 | (Application 3, [09:50-10:05]) → (30 minutes) → (Application 4, [10:15-10:20]) → (155 minutes) → (Application 5, [12:20-12:35]) |

In another example, the system may also add global data to the sequential patterns being developed. For example, particular events may be augmented with the weather at the time of the event, traffic at the time of the event, or the like. While the examples in Tables 1-5 are directed to application usage, it should be appreciated that the sequential patterns may be formed of mixed mode events, e.g., where a sequential pattern may include one or more different types of events relating to application usage, location, and/or calls, etc.

In block 525, the system may determine which sequential patterns are frequent sequential patterns. For example, given a sequence database and criteria such as a minimum support threshold, the system may perform sequential pattern mining to find a set of sequential patterns that meet the minimum support threshold. The system may use any of a variety of known data mining techniques. In one embodiment, the system may use a technique as disclosed in Pei et al., "Mining Sequential Patterns by Pattern-Growth: The prefixspan approach," IEEE Transactions on Knowledge and Data Engineering, vol. 16, issue 11, pps. 1424-1440 (2004).

The system may determine which of the sequential patterns occurs more than a minimum number of times, e.g., which are identified within the context data with at least a minimum frequency. Table 5 below illustrates an exemplary set of frequent sequential patterns with accompanying minimum supports that may be identified by the system.

TABLE 5

| Sequential Pattern No. | Frequent Sequential Pattern |
|---|---|
| 1 | {(Application 1, Morning) → (Application 2, Morning)}, 12% |
| 2 | {(Application 3, Morning) → (Application 4, Morning) → (Application 5, Afternoon)}, 8% |

In another exemplary implementation, the system may perform further filtering operations. For example, the system may generate sequences considering each event individually with no understanding of the semantic meaning or relationships between the events. In consequence, the system may generate uninteresting sequential pattern such as Call:Contact:X→time:SegmentofDay:Evening, where the event Call:Contact:X may be part of an event set {Call:Contact:X, time:DayType:Weekday, time:SegmentofDay:Afternoon} and attribute time:SegmentofDay:Evening may be part of an event set {Call:Contact:Y, time:DayType:Weekday, Time:SegmentofDay:Evening}. In this case, the system may perform a filtering operation to eliminate the meaningless, frequent sequential patterns and thereby output meaningful sequential patterns of the form {Call:Contact:X, time:DayType:Weekday, time:SegmentofDay:Afternoon}→{Call:Contact:Y, time:DayType:Weekday, time:SegmentofDay:Evening}. The system may output only the sequential patterns where each event set includes a time attribute and an event.

Table 6 below illustrates an exemplary set of frequent sequential patterns. The frequent sequential patterns of Table 6 are for a plurality of different users. The data is anonymized by redacting and/or replacing references to particular persons or contacts, places, and the like.

FIG. 6 is a block diagram illustrating operation of pattern aggregator 360 of FIG. 4. In one aspect, pattern aggregator 360 may perform ontology-based pattern aggregation. In the example of FIG. 6, pattern aggregator 360 may include one or more ontologies. As pictured, pattern aggregator 360 may include time and space ontologies 505, mobile context ontologies 510, and profile ontologies 515.

Time and space ontologies 505 may specify various places and times. An exemplary place ontology may include {space→indoor>mall/office/home; outdoor>park/lake/beach/trail}. An exemplary time ontology may include {time→weekday/weekend>morning/afternoon/evening/night}. Mobile context ontologies 610 may include one or more application category (or type) ontologies and one or more activity ontologies. An exemplary activity ontology may include {activity→indoor>cooking/baking/bathing/dining; outdoor>sports/exercise>hiking/running/biking}. Profile ontologies 615 may include one or more profession ontologies.

It should be appreciated that the particular ontologies illustrated in FIG. 6 are for purposes of illustration only. Fewer or more ontologies may be included and used by pattern aggregator 360. Examples of other ontologies that may be used and/or included within pattern aggregator 360 may include, but are not limited to, music types, store types, or the like.

Using ontologies, user-specific behavior, e.g., frequent sequential patterns uploaded from a user device, may be compared with crowd-sourced sequential patterns. In this manner, a user-specific sequential pattern such as {biking→juice bar} and/or {running→juice bar} may be correlated with the more generalized, crowd-sourced sequential pattern of {outdoor activity→drink fresh juice}.

FIG. 7 is a block diagram illustrating operation of profile generator 355 of FIG. 4. In one aspect, profile generator 355 may perform user-based grouping and/or clustering. In the

TABLE 6

| User | Log Type | Frequent Sequential Pattern |
|---|---|---|
| 1 | Application | time:frame:weekday_night,App:AppUsed:android.mms→time:frame:weekday_night,App:AppUsed:facebook |
| 1 | Application | time:frame:weekday_night,App:AppUsed:facebook→time:frame:weekday_night,App:AppUsed:browser |
| 1 | Call | time:frame:weekday_evening,Call:CONTACT:Y→time:frame:weekday_evening,Call:CONTACT:Z |
| 1 | Call | time:frame:weekday_evening,Call:CONTACT:X→time:frame:weekday_morning,Call:CONTACT:Y→time:frame:weekday_afternoon,Call:CONTACT:Z |
| 2 | Call | time:frame:weekday_morning,Call:CONTACT:P→time:frame:weekday_morning,Call:CONTACT:Q |
| 2 | Call | time:frame:weekday_morning,Call:CONTACT:P→time:frame:weekday_afternoon,Call:CONTACT:R |
| 2 | Location | time:frame:weekday_morning,Loc:PlaceID:c10→time:frame:weekday_morning,Loc:PlaceID:Work→time:frame:weekday_morning,Loc:PlaceID:c10→time:frame:weekday_morning,Loc:PlaceID:Work |
| 3 | Location | time:frame:weekday_morning,Loc:PlaceID:c3→time:frame:weekday_morning,Loc:PlaceID:Home→time:frame:weekday_morning,Loc:PlaceID:c3→time:frame:weekday_morning,Loc:PlaceID:Home→time:frame:weekday_morning,loc:PlaceID:c3 |
| 3 | Application | time:frame:weekday_evening,App:AppUsed:twlauncher→time:frame:weekday_evening,App:AppUsed:email→time:frame:weekday_evening,App:AppUsed:twlauncher |
| 3 | Call | time:frame:weekday_night,Call:CONTACT:A→time:frame:weekday_afternoon,Call:CONTACT:B→time:frame:weekday_afternoon,Call:CONTACT:C |
| 3 | Call | time:frame:weekday_afternoon,Call:CONTACT:D→time:frame:weekday_afternoon,Call:CONTACT:C |
| 3 | Call | time:frame:weekday_night,Call:CONTACT:E→time:frame:weekday_night,Call:CONTACT:F→time:frame:weekday_night,Call:CONTACT:G |
| 3 | Call | time:frame:weekday_morning,Call:CONTACT:H→time:frame:weekday_morning,Call:CONTACT:I | example of FIG. 7, profile generator 355 may generate one or more groups. The groups may be determined according to user behavior. In one embodiment, user groups may be determined using a clustering technique applied to the crowd-sourced frequent sequential patterns.

As pictured, profile generator 355 may determine a physically active group 705, an avid shopping group 735, and a Web group 725. In one aspect, membership in a group may be mutually exclusive. For example, a user that is a member of one group may not be a member of any other group. In another aspect, membership in a group may not be mutually exclusive. In that case, a user may be a member of one or more groups.

Physically active group 705 may include an active gym group 710, an active biking group 715, and an athlete group 720. Avid shopping group 730 may include a cosmetics shopping group 735 and an electronics shopping group 740. It should be appreciated that the particular group and sub-groups illustrated in FIG. 7 are for purposes of illustration only. Fewer or more groups and/or sub-groups may be included and used by profile generator 355.

Figure 8:
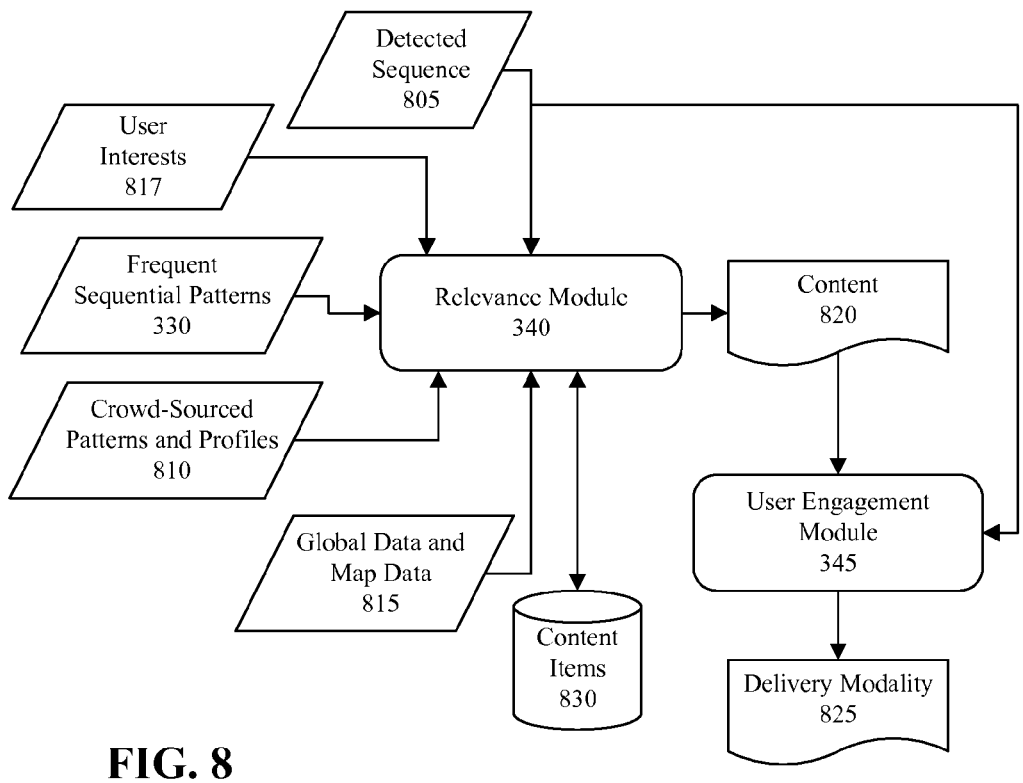
FIG. 8 is a block diagram illustrating operation of a pattern-based content module.

FIG. 8 is a block diagram illustrating operation of pattern-based content module 335 of FIG. 3. As pictured, relevance module 340 may receive a plurality of different inputs. For example, relevance module 340 may receive a detected sequence 805, user interests 817, frequent sequential patterns 330, crowd-sourced patterns and profiles 810, and global and map data 815. In one aspect, user interests 817 may be determined from one or more inferences. Relevance module 340 may determine content 820 based upon the received inputs. In one embodiment, relevance module 340 may not receive server based data such as crowd-sourced patterns and profiles 810 and/or global and map data 815. In that case, relevance module 340 may determine content 820 without relying upon crowd-sourced patterns and profiles 810 and/or global and map data 815.

In one aspect, relevance module 340 may predict a next event for the user based upon the received inputs. The predicted next event may be an activity such as communicating with someone via a call, an electronic mail, a text (SMS), using an application, or visiting a location such as a restaurant, movie, work, home, etc. For example, the predicted next event may be an event that is part of a frequent sequential pattern that is matched to detected sequence 805. Relevance module 340 may generate content 820 based upon the predicted next event. Content 820 may be a suggestion to initiate the predicted next event, a mechanism for facilitating the predicted next event, an incentive for the user to initiate the predicted next event, a promotion, or the like.

In one embodiment, one or more content items may be selected from a data store, e.g., a database, of content items 830. Content items 830 may be associated with particular locations, restaurants, movies, and/or other activities. In one embodiment, relevance module 340 may search or query content items 830 for one or more content items related to the predicted next event. For example, the predicted next event may be a coffee shop or a particular coffee shop. In that case, relevance module 340 may retrieve a content item, e.g., a promotion, for the particular coffee shop determined to be the predicted next event or for a coffee shop located within a predetermined distance of the user's current location or an anticipated next (e.g., predicted) location.

Content 820, as noted may be selected based upon the predicted next event as determined by relevance module 340. For example, if the predicted next event is that the user will visit the mall, the particular content item that may be selected as content 820 may be a coupon or programmatic instructions for retrieving and/or displaying a coupon. If the predicted next event is biking, the particular content item that may be selected as content 820 may be a biking route and/or program instructions to execute an application and generate a biking route.

In still another aspect, content items 830 may be associated with particular users, particular frequent sequential patterns, locations, and/or other context data. In cases where content items 830 are associated with additional data as noted, the selection of one or more content items for a user may be predicated on a search of content items using such additional data which may include more than the user's predicted next event. The search may specify search parameters including detected sequence 805, user interests 817, crowd-sourced patterns and/or profiles correlated with frequent sequential patterns 330, etc.

In one aspect, relevance module 340 may utilize crowd-sourced sequential patterns and/or profiles, or limit their usage, to cases where insufficient user data is available. For example, in cold start situations where frequent sequential patterns 330 are unavailable or an insufficient number of frequent sequential patterns 330 are available, relevance module 340 may utilize crowd-sourced patterns and/or profiles. In illustration, consider the case of a new user A that is identified to have a frequent sequential pattern such as {Running→Juice Bar}. User A may be categorized to a profile of "physically active." User B may also belong to the physically active crowd-sourced profile. The system may determine that user B has a high percentage of frequent sequential patterns in common, e.g., approximately 90% or more, with user A. Consider a case where user B has a frequent sequential pattern {Gym→Laundry→Restaurant→Laundry→Home} indicating that user B goes to the laundry after the gym, eats at a nearby restaurant, then collects the laundry before going home. If a detected sequence 805 of user A, which may be detected in real time, indicates that user A visits the laundry after the gym, the system may recommend a restaurant nearby the location of user A as content 820.

In another embodiment, relevance module 340 may access a third party content selection system that selects one or more content items based upon the predicted next event provided by relevance module 340. In any case, the particular content items determined from content items 830 may be output as content 820.

User engagement module 345 may receive content 820 and/or detected sequence 805. User engagement module 345 may determine a delivery modality 825 for providing content 820 to the user. Delivery modality 825 may specify how content 820 is to be made available to the user. Further, delivery modality 825 may specify when, e.g., timing, for delivering content 820 to the user.

In one example, delivery modality 825 may include one or more instructions that cause the user's device to implement an executable operation. For example, delivery modality 825 may specify that content 820 is to be provided using a particular application. The device of the user may execute delivery modality 825, which may cause the device to launch an application through which content 820 may be displayed or otherwise made available to the user. In still another example, delivery modality 825 may cause the device to download and install a particular application through which content 820 may be provided or otherwise made available. For example, the device may execute delivery modality 825, determine that the application through which content 820 is to be made available is not installed on the device, responsive to that determination, download and install the needed application, execute the application, and present content 820 through the application.

In illustration, consider an example where the system determines that the user made a phone call in the afternoon from home and, following the phone call, goes shopping. The system may determine that the day is a weekend day and that shopping started at approximately 2:30 pm. The call event may be detected from a call log. The shopping event may be determined from the location of the user and the day type being a weekend day. Thus, the detected event sequence of Call→Shopping may be detected by the system.

The system may compare the detected event sequence with one or more other ones of the received inputs illustrated in FIG. 8. The system may determine the length of time that the user typically shops given the current context, e.g., date, time of day, type of day, location, etc. Since the currently detected event sequence is occurring on a weekend day, the system may determine that the user is accompanied by family. In another example, the system may determine that another device is proximate, e.g., within a predetermined distance, to the system. The device may be one that is recognized to be associated with another user having an established relationship with the user. The other user, for example, may be on a same mobile plan, same data usage and/or cloud service plan, be explicitly identified as a family member or friend, etc.

In one example, the system may compare the detected sequence 805 with one or more frequent sequential patterns 330 and/or crowd-sourced patterns and profiles 810. The system may identify a frequent sequential pattern, for example, that also includes ordered events of Call→Shopping occurring on a weekend day with a matching time frame for the events. The system may determine that the event following shopping (the event in which the user is currently engaged) in the matched frequent sequential pattern is a family movie. The system may select the event, in this case a family movie, as the predicted event.

The system may provide content 820 as a recommend of one or more family movies to the user. In recommending the family movies, the system further may suggest available show times for the movies. The suggested movies may be family movies that have a starting time that generally coincides or follows a predicted end time of the shopping event. For example, the system may predict that the shopping event will end at approximately 4:45 pm. As such, the system may suggest one or more movies with start times of 5:00 pm, 5:10 pm, 7:35 pm, 7:45 pm, etc. The system may deliver content relating to one or more movies with appropriate start times as noted.

The modality in which the content is delivered may be determined according to the current event of the user. For example, the current event may be augmented with detected audio information indicating the level of surrounding noise in the user's current environment. As the user is shopping, e.g., as already determined, and the surrounding noise level is likely high, the system may determine that a loud audible queue may be required to alert the user as part of the delivery modality. The system, e.g., the user's mobile device, may generate an audible queue and vibrate to alert the user of the content as part of delivery modality 825. Since the content is to attend a movie, the delivery modality may include providing the content through a movie related application of the mobile device through which the user may also purchase tickets for the suggested movie(s). The content may be provided while the current event (e.g., shopping) is taking place (e.g., prior to the predicted end time of the current event), or at or about the predicted end time of the current event.

Continuing with the example, the user may decide to attend one of the suggested movies. The system may determine that the user has decided to attend the movie through analysis of context data on the device. As noted, pattern mining module 325 may also perform real time analysis of context data to detect an event sequence. In one example, the system may determine that the user has completed a financial transaction to purchase movie tickets using his or her device. In another example, the system may determine that the location of the device is at or near a known movie theatre. Location determination may be made using coordinates, using indoor and/or outdoor localization techniques, or a combination thereof that may be cross-referenced with POIs or other map data.

Accordingly, the current context for the user is now at the movies. The current event sequence for the user is now "Call→Shopping→Movies." The system may again compare the detected event sequence with one or more of the received inputs illustrated in FIG. 8. The system may estimate the time the user will finish watching the movie. Given the described inputs, the system may determine that the user is likely to go out to dinner following the movie.

The system may recommend one or more restaurants to the user. In recommending restaurants, the system further may provide an incentive such as a coupon. For example, the system may predict that the movie will end at approximately 7:20 pm. As such, the system may suggest one or more restaurants. The suggested restaurants may be restaurants with availability at a time at or near the predicted end time of the movie and/or that are located near the user's current location. The suggested restaurant(s) also may be of similar style, e.g., recommended attire and/or cuisine, to a restaurant found in a frequent sequential pattern found to match the current event sequence.

The modality in which the content is delivered may be determined according to the current context of the user. For example, the current context may include light sensor information indicating a dark environment that, when taken in combination with the user's location, indicates that the user is still in the movie. As the user watches the movie, the system may determine that a silent notification is appropriate as part of the delivery modality. The system, e.g., the user's mobile device, may generate a silent alert and/or vibrate to alert the user of the content. In one aspect, the content may be an alert or other message that, when selected by the user, launches an application on the mobile device through which further information about the content may be provided. In this example, user selection of the alert on the mobile device may cause a dining and/or restaurant review application to be launched. The alert may cause the application to provide a coupon or present a view through which the user may make a reservation at a selected restaurant.

In another example, consider the case where user A has a frequent sequential pattern of {Weekend Morning, Browse Bike Trails On Phone→Weekend Afternoon, Drive To Bike Trail Using Navigation On Phone→Weekend Afternoon, Bike Using Phone Application For Trail Map→Weekend Evening, Upload Biking Data}. If the system determines, based on the discussed input(s), that the predicted next event is biking and that rain is likely at the time and location for biking using global data, the system may recommend a customized bike outing in terms of bike route and time to avoid the location and/or duration of the rain. Further, consider the case where the system recommends an alternative, predicted next event. For example, user A may belong to a physically active crowd-sourced profile associated with a sequential pattern of {Weekend Morning, Weather Cloudy→Weekend Afternoon, Weather Rainy, Bowling}. In this case, the system may determine that bowling should be the predicted next event responsive to determining that rain is likely to occur during the originally predicted next event of biking. Thus, the crowd-sourced data may be used to suggest one or more other events and/or alternate events.

In different settings, different criteria, whether user-specific frequent sequential patterns, aggregated and/or crowd sourced sequential patterns and/or profiles, global data, etc., may be weighted differently in determining the predicted next event. As an example, a user-specific frequent sequential pattern may be given greater weight than a crowd-sourced sequential pattern. Consider the case where user A has a frequent sequential pattern where, on Thursdays, user A takes out food from a restaurant before going home. The sequence may be {Work-Read Restaurant Reviews Using Restaurant Application On Mobile Phone→Order Food Using Food Ordering Application On Mobile Phone→Use Mobile Map Application To Travel To Restaurant→Home}. User A may also belong to a crowd-sourced profile with a crowd-sourced sequential pattern of {Work-→Gym→Home}. In this case, user A's frequent sequential pattern may be given greater weight than the crowd-sourced sequential pattern due to the current day being Thursday even though the crowd-sourced sequential pattern is more frequent and exhibited by numerous users belonging to the profile.

In one embodiment, relevance module 340 may utilize an expression such as $M_i = \sum_{j=1}^{n} W_j * A_{ij}$ to select an input that matches the detected event sequence. Within the expression, $A_{ij}$ may be the input being considered (e.g., the frequent sequential pattern, the crowd sourced profile, the crowd sourced frequent sequential pattern, etc.), $W_j$ may be the weight for the input $A_{ij}$, and $M_i$ may be the score for the input. In one aspect, the system may select the top K inputs of frequent sequential patterns 330, crowd sourced frequent sequential patterns, and/or crowd-source profiles (crowd sourced patterns and profiles 810). The value of K may be an integer value of one or more. The system may select the predicted next event from each of the top K inputs. For each of the top K inputs, the system may identify the event matching the current event or context of the detected event sequence and select the next, e.g., immediately following, event from each of the top K inputs.

In another embodiment, relevance module 340 may utilize the expression $M_i = \sum_{j=1}^{n} W_j * A_{ij}$ to select among a plurality of specific contexts, e.g., specific candidates, for the predicted next events. For example, consider the case where relevance module 340 has determined that the predicted next event may be a movie or a restaurant. The movie and restaurant predicted next events may be determined from frequent sequential patterns found to match the event sequence or may be determined using the expression discussed above where inputs are weighted. For each of the predicted next events, the system may select and/or provide one or more specific candidates. Relevance module 340, for example, may apply the expression $M_i = \sum_{j=1}^{n} W_j * A_{ij}$, where in this example $A_{ij}$ may be a specific context (or candidate) of a predicted next event, $W_j$ may be the weight for the specific context, and $M_i$ may be the score for specific context $A_{ij}$.

In illustration, the system may determine a list of top restaurant candidates, e.g., the top K scoring restaurant candidates A, B, and C, for the restaurant predicted next event. The system may determine a list of top movie candidates, e.g., the top K scoring movie candidates X, Y, and Z, for the movie predicted next event. The system may present restaurant candidates A, B, and C and/or movie candidates X, Y, and Z. In determining a specific context for the various predicted next events, the weight $W_j$ for each specific context may be determined, or calculated, according to factors including, but not limited to, user interest(s) (e.g., preferred types of cuisine, preferred types of cuisine when alone, when with friends, when with family; preferred movie genres, preferred movie genres when alone, when with friends, when with family, etc.), distance between the specific context and a current location of the user, crowd sourced reviews, and/or the like. For example, the weight $W_j$ for each candidate may be a weighted sum of one or more or all of the aforementioned factors.

Figure 9:
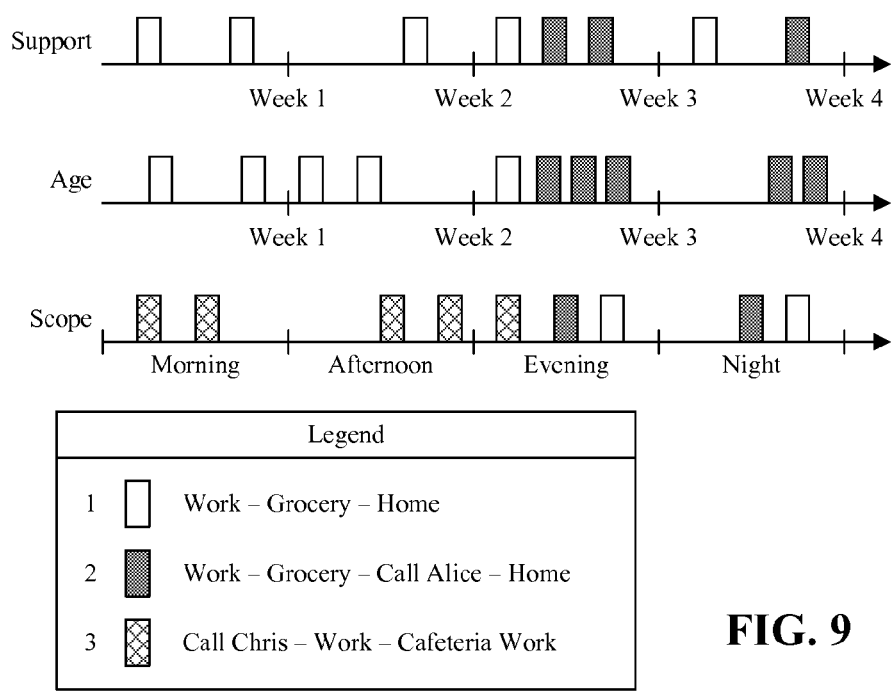
FIG. 9 is a diagram illustrating exemplary criteria that may be used by a relevance module.

FIG. 9 is a diagram illustrating exemplary criteria that may be used by relevance module 340 of FIG. 3. In the example of FIG. 9, three different criteria including support, age, and scope are illustrated. The criteria may be used to select one frequent sequential pattern over another, e.g., disambiguate among a plurality of frequent sequential patterns, when predicting a next event for a user.

The top timeline of FIG. 9 illustrates the support criterion. The support criterion may specify how often a particular frequent sequential pattern occurs for a user. For example, support may be specified as a frequency of occurrence for a frequent sequential pattern over a selected period of time such as a day, more than one day, a week, a work week, a weekend, several weeks, a month, etc. The top timeline indicates that frequent sequential pattern 1 occurs with greater frequency than frequent sequential pattern 2. Considering support alone, frequent sequential pattern 1 is considered more likely to occur than frequent sequential pattern 2.

In another aspect, consider the case where frequent sequential patterns 1 and 2 have the same first and second events and differing third events. If a detected event sequence matches the first two events of both frequent sequential pattern 1 and frequent sequential pattern 2, the system may select frequent sequential pattern 1 based solely on the support criterion for predicting the next event.

The middle timeline of FIG. 9 illustrates the age criterion. The age criterion may indicate recency or freshness. For example, the middle timeline illustrates that frequent sequential pattern 2 has occurred more recently than frequent sequential pattern 1. In the example of the middle timeline, the support for frequent sequential pattern 1 and for frequent sequential pattern 2 is equivalent over the four weeks shown. Considering age, taken in isolation, frequent sequential pattern 2 is more likely to occur than frequent sequential pattern 1.

Referring to the prior example, consider again the case where frequent sequential patterns 1 and 2 have the same first and second events and differing third events. If a detected event sequence matches the first two events of both frequent sequential pattern 1 and frequent sequential pattern 2, the system may select frequent sequential pattern 2 based solely on the age criterion for predicting a next event.

The bottom timeline of FIG. 9 illustrates the scope criterion. The scope criterion indicates specificity. For example, the bottom timeline illustrates that frequent sequential pattern 3 may occur morning, afternoon, and evening. The bottom timeline further indicates that frequent sequential patterns 1 and 2 may occur in the evening and at night. The system may determine the frequent sequential pattern 3 is more likely to occur than frequent sequential patterns 1 and 2 since frequent sequential pattern 3 may occur at various times throughout the day, while frequent sequential patterns 1 and 2 are more limited. Frequent sequential patterns 1 and 2, for example, may be weighted more heavily while a detected event sequence is evening or night, while frequent sequential pattern 3 may be weighted more heavily during morning or afternoon.

In one embodiment, the system may utilize a weighted sum of the aforementioned criteria when determining which frequent sequential pattern of a plurality of frequent sequential patterns matches a detected event sequence. For example, given multiple frequent sequential patterns that match a detected event sequence, a weighted sum calculated using support, age, and scope may be used to select which of the matching frequent sequential patterns is more likely. In any case, the selected frequent sequential pattern specifies the predicted next event for the user.

In still another example, the frequent sequential patterns may also specify a particular device of the user that is associated with, e.g., used for, each event. In cases where user data may be synchronized and/or shared across multiple devices of the user, the particular device used in a given context may also be a distinguishing point. For example, two frequent sequential patterns may be similar or the same albeit for the particular device associated with one or more of the events in each respective frequent sequential pattern.

A first frequent sequential pattern may be (Home, MapMyRide, Laptop)→(Car Navigation System, Driving)→(Biking, Trail Map, Smartwatch)→(Upload data, Laptop). The first frequent sequential pattern means the user uses an application called "MapMyRide" to determine a biking route while at home using a laptop device. The user then uses a car navigation system to drive, then bikes while using a Trail Map application on his or her smartwatch. Next, the user uploads data from the ride, e.g., a route, using his or her laptop.

A second frequent sequential pattern may be (Home, MapMyRide, Mobile Phone)→(Phone Navigation System, Driving)→(Biking, Trail Map, Mobile Phone)→(Upload data, Mobile Phone). The second frequent sequential pattern means the user uses an application called "MapMyRide" to determine a biking route while at home using a mobile phone. The user then uses the mobile phone navigation system to drive, then bikes while using a Trail Map application on his or her mobile phone. Next, the user uploads data from the ride, e.g., a route, using his or her mobile phone.

In an example where the user matches a detected event sequence with part of the first frequent sequential pattern, e.g., (Home, MapMyRide, Laptop)→(Car Navigation System, Driving)→(Biking, Trail Map, Smartwatch), the system may determine that the predicted next event is (Upload data, Laptop). In that case, the system, e.g., a mobile device of the user where context data is being synchronized among the various devices, may send content to the laptop specifying an instruction to launch an application for uploading the data, launch a browser and navigate to a particular Website where the data may be uploaded, etc.

If the system matches a detected event sequence with part of the second frequent sequential pattern, e.g., (Home, MapMyRide, Mobile Phone)→(Phone Navigation System, Driving)→(Biking, Trail Map, Mobile Phone), the system may determine that the predicted next event is (Upload data, Mobile Phone). In this case, the system may launch an application on the mobile phone that may be used to upload the data, launch a browser on the mobile phone and navigate to a particular Website where the data may be uploaded. As such, the particular device(s) used to implement the various detected event sequences may change the content that is provide and/or the modality used to provide the content.

Figure 10:
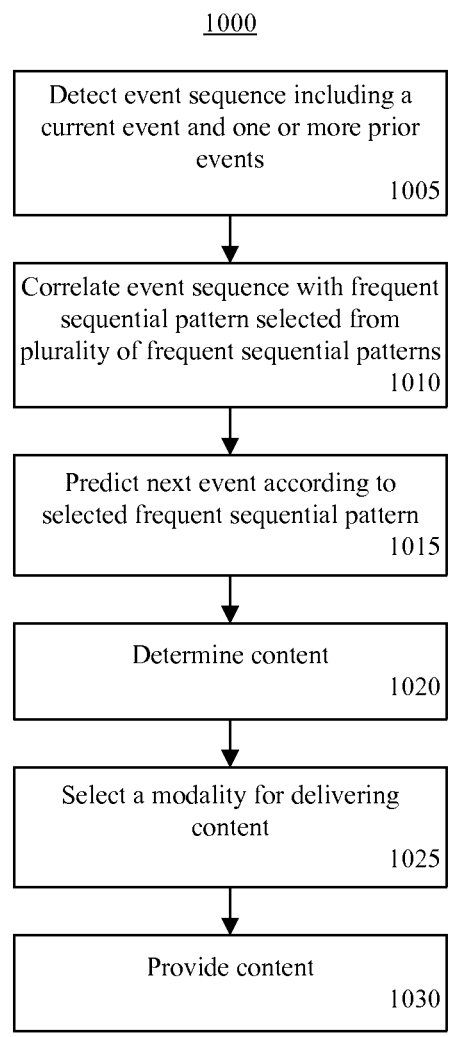
FIG. 10 is a flow chart illustrating a method of sequential behavior-based content delivery.

FIG. 10 is a flow chart illustrating a method 1000 of sequential behavior-based content delivery. Method 1000 may be performed by a system as described within this specification. For example, method 1000 may be performed by a mobile device, may be performed by one or more servers, or may be performed by a combination of a mobile device and one or more servers.

In block 1005, the system may detect an event sequence. The event sequence may include a current event in which the user is engaged and one or more prior events. The event sequence may be a sequence that is detected within a specified time period, e.g., a day, several hours, etc.

In block 1010, the system may correlate the event sequence with a frequent sequential pattern selected from a plurality of frequent sequential patterns. The frequent sequential patterns may be user-specific and/or crowd-sourced. In one aspect, the system may disambiguate among one or more frequent sequential patterns that have been determined to match the event sequence. For example, the system may select one particular frequent sequential pattern from a plurality of matching frequent sequential patterns according to frequency, recency, and/or specificity. As discussed, in one embodiment, the system may select, or disambiguate, by using a weighted sum of attributes including frequency, recency, and/or specificity.

As noted, the system may compare the event sequence against any one or more of the various inputs provided to multi-criteria relevance module 340. In one example, the system may utilize a weighted sum when considering the contribution of each input as compared against the detected sequence.

In one embodiment, crowd-sourced data obtained from remote servers (e.g., a cloud computing infrastructure) may be used for bootstrapping purposes. In cases where insufficient user data is available to generate the frequent sequential patterns, crowd-sourced data may be used. For example, the crowd-sourced data may be weighted more heavily when predicting the next event of the user. As more user-specific context data accumulates, the importance of the crowd-sourced data, i.e., the weight, may be reduced.

In block 1015, the system may predict a next event according to the selected frequent sequential pattern. In block 1020, the system may determine content. The system may generate and/or select content, as the case may be, based upon the predicted event. For example, the content may be an incentive for a particular location and/or activity, e.g., a coupon for a particular restaurant, information suggesting a next activity, an offer to book and/or schedule the next activity, or the like. In one aspect, the system may include a database of content items that may be selected based upon the predicted next event.

In block 1025, the system may select a modality for delivering the content. The modality may be selected, at least in part, according to a current event in which the user is participating. In another example, the modality may be determined, at least in part, according to sensor data detected by a device of the user. For example, the device may detect a particular type of lighting and/or lighting pattern, a particular audio environment, be placed in a particular mode (e.g., silent), etc., which may be used to determine the modality of delivering the content.

As discussed, the modality may also specify when the content is to be made available. In one aspect, the content may be made available responsive to generating and/or selecting the content. In another aspect, the content may be provided prior to the end of the current activity in which the user is engaged. For example, the system may predict the ending time of the current event and/or a start time of the next event. The system may provide the content to the user prior to the estimated start time of the predicted event and/or prior to the estimated end time of the user's current event. The modality may also include selecting the particular device used to provide the content.

In block 1030, the system may provide content. The content may be provided to the user using the selected modality. In one aspect, the context and one or more elements of the modality may be generated as one or more executable instructions that may be executed by the user's device. For example, the instructions may collectively specify the content and how the content is to be delivered such as through vibration, ringing, an alert, etc. In this regard, the delivery modality may include instructions that activate and/or deactivate particular components of a user's device, e.g., the mobile device.

The system may continually predict next events from time to time, continually, or the like. In one aspect, the system may only determine content and a delivery modality responsive to determining that the predicted next event has a confidence score above a predetermined confidence score threshold. For those predicted next events where the confidence score is below the confidence score threshold, the system may discontinue processing the predicted next event to determine content and/or a delivery modality relating thereto.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission, or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

As used herein, the term "cloud computing" may refer to a computing model that facilitates convenient, on-demand network access to a shared pool of configurable computing resources such as networks, servers, storage, applications, and/or services. These computing resources may be rapidly provisioned and released with minimal management effort or service provider interaction. Cloud computing promotes availability and may be characterized by on-demand self-service, broad network access, resource pooling, rapid elasticity, and measured service. Cloud computing generally supports service models such as Cloud Software as a Service (SaaS), Cloud Platform as a Service (PaaS), and/or Cloud Infrastructure as a Service (IaaS). Cloud computing further may support deployment models such as Private cloud, Community cloud, Public cloud, and/or Hybrid cloud. Further information relating to cloud computing may be obtained from the National Institute of Standards and Technology (NIST) and, more particularly, the Information Technology Laboratory of NIST.

A computer program product may include a computer readable storage medium (or media) having computer readable program instructions thereon for causing a processor to carry out aspects of the embodiments described herein. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

The invention claimed is:

1. A method, comprising:
   detecting, using a processor, an event sequence involving at least one device of a user, wherein the event sequence comprises a current event and a prior event separated by an amount of time;
   correlating, using the processor, the event sequence with a frequent sequential pattern selected from a plurality of frequent sequential patterns associated with the user by matching the current event, the prior event, and the amount of time of the event sequence with a plurality of ordered events and amount of time between the plurality of ordered events of the selected frequent sequential pattern;
   predicting, using the processor, a next event for the user according to the plurality of ordered events specified by the selected frequent sequential pattern; and
   responsive to predicting the next event, providing content relating to the next event to the device user using the processor.

2. The method of claim 1, wherein the plurality of frequent sequential patterns include sequential patterns generated from logs of the at least one user device and sequential patterns generated from crowd sourcing.

3. The method of claim 1, wherein providing the content comprises:
   determining a modality for delivering the content to the device of the user according to the current event, wherein the modality specifies an application of the at least one device of the user.

4. The method of claim 1, wherein providing the content comprises:
   estimating a start time of the next event; and
   delivering the content prior to the estimated start time of the next event.

5. The method of claim 1, wherein correlating comprises:
   disambiguating between at least two of the plurality of frequent sequential patterns determined to match the event sequence by selecting the selected frequent sequential pattern from among the at least two of the plurality of frequent sequential patterns determined to match the event sequence according to frequency of occurrence of each of the at least two of the plurality of frequent sequential patterns.

6. The method of claim 1, wherein correlating comprises:
   disambiguating between at least two of the plurality of frequent sequential patterns determined to match the event sequence by selecting the selected frequent sequential pattern from among the at least two of the plurality of frequent sequential patterns determined to match the event sequence according to recency of occurrence of each of the at least two of the plurality of frequent sequential patterns.

7. The method of claim 1, wherein correlating comprises:
   disambiguating between at least two of the plurality of frequent sequential patterns determined to match the event sequence by selecting the selected frequent sequential pattern from among the at least two of the plurality of frequent sequential patterns determined to match the event sequence according to specificity of each of the at least two of the plurality of frequent sequential patterns, wherein specificity indicates time of day that a frequent sequential pattern may occur.

8. A system, comprising:
   a processor programmed to initiate executable operations comprising:
   detecting an event sequence involving at least one device of a user, wherein the event sequence comprises a current event and a prior event separated by an amount of time;
   correlating the event sequence with a frequent sequential pattern selected from a plurality of frequent sequential patterns associated with the user by matching the current event, the prior event, and the amount of time of the event sequence with a plurality of ordered events and amount of time between the plurality of ordered events of the selected frequent sequential pattern;
   predicting a next event for the user according to the plurality of ordered events specified by the selected frequent sequential pattern; and
   responsive to predicting the next event, providing content relating to the next event to the device.

9. The system of claim 8, wherein the plurality of frequent sequential patterns include sequential patterns generated from logs of the at least one user device and sequential patterns generated from crowd sourcing.

10. The system of claim 8, wherein providing the content comprises:
    determining a modality for delivering the content to the device of the user according to the current event, wherein the modality specifies an application of the at least one device of the user.

11. The system of claim 8, wherein providing the content comprises:
    estimating a start time of the next event; and
    delivering the content prior to the estimated start time of the next event.

12. The system of claim 8, wherein correlating comprises:
    disambiguating between at least two of the plurality of frequent sequential patterns determined to match the event sequence by selecting the selected frequent sequential pattern from among the at least two of the plurality of frequent sequential patterns determined to match the event sequence according to frequency of occurrence of each of the at least two of the plurality of frequent sequential patterns.

13. The system of claim 8, wherein correlating comprises:
    disambiguating between at least two of the plurality of frequent sequential patterns determined to match the event sequence by selecting the selected frequent sequential pattern from among the at least two of the plurality of frequent sequential patterns determined to match the event sequence according to recency of occurrence of each of the at least two of the plurality of frequent sequential patterns.

14. The system of claim 8, wherein correlating comprises:
disambiguating between at least two of the plurality of frequent sequential patterns determined to match the event sequence by selecting the selected frequent sequential pattern from among the at least two of the plurality of frequent sequential patterns determined to match the event sequence according to specificity of each of the at least two of the plurality of frequent sequential patterns, wherein specificity indicates time of day that the a frequent sequential pattern may occur.

15. A computer program product comprising a computer readable storage medium having program code stored thereon, the program code executable by a processor to perform a method comprising:
detecting an event sequence involving at least one device of a user, wherein the event sequence comprises a current event and a prior event separated by an amount of time;
correlating the event sequence with a frequent sequential pattern selected from a plurality of frequent sequential patterns associated with the user by matching the current event, the prior event, and the amount of time of the event sequence with a plurality of ordered events and amount of time between the plurality of ordered events of the selected frequent sequential pattern;
predicting a next event for the user according to the plurality of ordered events specified by the selected frequent sequential pattern; and
responsive to predicting the next event, providing content relating to the next event to the device.

16. The computer program product of claim 15, wherein the plurality of frequent sequential patterns include sequential patterns generated from logs of the at least one user device and sequential patterns generated from crowd sourcing.

17. The computer program product of claim 15, wherein providing the content comprises:
determining a modality for delivering the content to the device of the user according to the current event, wherein the modality specifies an application of the at least one device of the user.

18. The computer program product of claim 15, wherein providing the content comprises:
estimating a start time of the next event; and
delivering the content prior to the estimated start time of the next event.

19. The computer program product of claim 15, wherein correlating comprises:
disambiguating between at least two of the plurality of frequent sequential patterns determined to match the event sequence by selecting the selected frequent sequential pattern from among the at least two of the plurality of frequent sequential patterns determined to match the event sequence according to frequency of occurrence of each of the at least two of the plurality of frequent sequential patterns.

20. The computer program product of claim 15, wherein correlating comprises:
disambiguating between at least two of the plurality of frequent sequential patterns determined to match the event sequence by selecting the selected frequent sequential pattern from among the at least two of the plurality of frequent sequential patterns determined to match the event sequence according to at least one of recency of occurrence or specificity of each of the at least two of the plurality of frequent sequential patterns, wherein specificity indicates time of day that a frequent sequential pattern may occur.

* * * * *